US 6,565,423 B1

(12) United States Patent
Matsunaga et al.

(10) Patent No.: US 6,565,423 B1
(45) Date of Patent: May 20, 2003

(54) APPARATUS AND METHOD FOR POLISHING A FERRULE END FACE FOR AN OPTICAL CONNECTOR

(75) Inventors: Kazuo Matsunaga, Kanagawa-ken (JP); Shinsuke Matsui, Kodaira (JP); Fumikazu Ohira, Kodaira (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 0 days.

(21) Appl. No.: 09/517,902

(22) Filed: Mar. 3, 2000

(30) Foreign Application Priority Data

Mar. 5, 1999 (JP) .......................................... P11-059391

(51) Int. Cl.7 ................................................. B24B 7/22
(52) U.S. Cl. ........................................ 451/270; 451/41
(58) Field of Search ........................ 451/41, 270, 271, 451/370, 384, 390, 391, 166

(56) References Cited

U.S. PATENT DOCUMENTS

| | | | | |
|---|---|---|---|---|
| 4,693,035 A | * | 9/1987 | Doyle .......................... | 451/460 |
| 5,184,433 A | * | 2/1993 | Maack .......................... | 451/270 |
| 5,185,966 A | * | 2/1993 | Mock, Jr. et al. ............. | 451/41 |
| 5,743,785 A | * | 4/1998 | Lundberg et al. ............. | 451/41 |
| 6,110,013 A | * | 8/2000 | Minami et al. ................ | 451/41 |

FOREIGN PATENT DOCUMENTS

| | | | | |
|---|---|---|---|---|
| JP | 363185558 | * | 8/1988 | .................. 451/66 |
| JP | 06015556 | | 1/1994 | |

* cited by examiner

Primary Examiner—Robert A. Rose
(74) Attorney, Agent, or Firm—Kilpatrick Stockton LLP

(57) ABSTRACT

An apparatus and method are provided for polishing end faces of optical connector ferrules, wherein control is performed to achieve uniform pressure of each ferrule with respect to a polishing plate of the apparatus, there by improving the precision of polishing the ferrule end faces. A polishing apparatus (100) for polishing end faces of ferrules to a convex spherical shape comprises a polishing plate (4), a polishing apparatus main unit (2) capable of freely moving the polishing plate (4) in the XY plane while rotating it, a cylinder block mechanism (3) with a plurality of pressure-applying mechanisms (13) arranged in a ring, and a height adjustment mechanism (5) of the cylinder block mechanism, the pressure-applying mechanism (13), having a piston shaft (16) which is pushed outward in a direction perpendicular to the polishing plate (4) by an air cylinder (17), the ferrule (10) being mounted to the end part of the pressure-applying mechanism (13) via a ferrule holding plate (20). Each of the ferrules (10) has imparted to it an appropriate pressure by an air cylinder (17) thereby pressing it up against the polishing plate (4), so that the proper polishing is achieved even if the overall lengths of the ferrules (10) are different. By selecting the polishing grit material used, it is possible to simplify the polishing process.

33 Claims, 6 Drawing Sheets

APPARATUS AND METHOD FOR POLISHING A FERRULE END FACE FOR AN OPTICAL CONNECTOR

BACKGROUND OF THE INVENTION

1. Field of the Invention

The present invention relates to a polishing apparatus and method of polishing a ferrule end face for an optical connector, and more particularly to a technique for use when polishing the end face of a ferrule mounted to the joining part of a optical connectors that join together optical fibers, whereby a plurality of ferrule end faces are polished at one time with a uniform pressure, thereby eliminating a polishing process step, so as to both simplify and reduce the cost of polishing the ferrule end faces for an optical connector.

2. Description of the Background Art

In contrast to splicing, which provides a permanent connection between optical fibers, an optical connector is a connection joining member enabling a removable connection between optical fibers. In the past, a variety of practical optical connectors have been developed to enable connection and disconnection between optical fibers. For example, in a known single-fiber optical connector, in order to achieve a joint with little axial skew or tilt angle, an optical fiber is inserted into the center of a ceramic ferrule (i.e., a tubular reinforcement bar used for joining), and adhered in place, after which the optical connector ferrule (hereinafter simply referred to as ferrule) is inserted into a hollow tube having a precise inner diameter, the ends of ferrules being butted up against one another and screwed together by means of threads on the outside thereof. Because of its superior connection characteristics, the above-noted type of optical connector is widely used in many optical communication fields.

In an optical connector as described above, because the ferrules are directly butted up against one another, it is important that the ends of the ferrules be precisely polished, so as to lower the connection loss. Because optical connectors are used throughout an optical communications system, it is important to be able to lower the cost of the optical connector by enabling polishing in a short period of time. That is, there is a need for a technique that not only achieves highly precise optical connector characteristics, but also one that polishes the ferrule ends of an optical connector manufacturable with a low cost.

In a conventional polishing apparatus for achieving a convex spherical surface at a ferrule end face, a polishing plate formed in a concave spherical shape was held fixed, and the ferrule was fixed so as to be perpendicular to the concave spherical surface of the polishing plate. By imparting to the ferrule precession movement, comprising undulation and rotation about the center of the concave spherical surface, or forward and reverse rotation combined with undulation movement, the contact point is caused to move, thereby polishing the ferrule end face. Because of this process, there was the problem of breakage of the optical fiber connected at the rear of the ferrule by the action of the rotation or undulating movement of the ferrule. Additionally, a polishing apparatus performing such processing not only requires the formation of a polishing plate on a concave spherical surface, but also requires a highly precise mechanism to impart rotational or undulating movement to the ferrule, thereby making the polishing apparatus costly.

In general, when a bare optical fiber is inserted into a ferrule and then held in place with an optical adhesive, there is a swelling up of excess hardened adhesive on the end face of the ferrule. Thus, it is necessary to remove this adhesive agent before polishing the ferrule end face into a conex spherical shape.

Given the above, the inventor proposed a ferrule end face polishing apparatus wherein a polishing plate is caused to move in a path that describes the outer contour of the petals of a flower, this path synthesized by the revolution and autorotation of an external-tooth gear in a planetary gear mechanism having an internal-tooth sun gear and an external-tooth planet gear combined with an XY stage. This polishing apparatus is disclosed, for example, in the Japanese Patent Laid-open Application publication H6-15556. According to this polishing apparatus, after removing hardened adhesive agent from the ferrule end face without imparting rotation or undulation movement to the ferrule, the ferrule end face is polished with high precision to a convex spherical shape.

In the above-noted optical connector ferrule polishing apparatus, however, the following problems remained.

(1) Because there is a buildup of hardened adhesive agent on the end face of the ferrule to be polished, the overall length of each ferrule is different. Using the above-noted optical connector ferrule end face polishing apparatus, a plurality of ferrules are mounted to one ferrule holding jig, and pressed up against the polishing plate with a single pressure-applying mechanism. As a result, because a plurality of ferrules are polished under pressure applied by a single pressure-applying mechanism, because of the difference in the overall length of the ferrules, the pressures applied to individual ferrules differ, resulting invariations in the shape of the end faces of the ferrules. It is therefore not possible to achieve the optimum end face shape for all the ferrules mounted in the single ferrule holding jig.

(2) At the beginning of the processing step, polishing starts from ferrules that are longer. For this reason, some polishing time is required until the lengths of all the ferrules are made uniform, thereby resulting in a worsening of polishing efficiency.

(3) Because polishing starts from ferrules that are longer, in the case of polishing a ferrule end face for an optical connector, in which the polished surface area is small, a high pressure is applied to the longer ferrules during processing. For this reason, there is a tendency for the exposed surface of the optical fiber in the ferrule to become work distorted or damaged, resulting in a worsening of optical characteristics, and in particular of reflection attenuation.

(4) In polishing with a conventional polishing apparatus, because the four steps of adhesive agent removal, rough polishing, medium finishing, and a finished polishing were required, the work efficiency was extremely poor. That is, with four polishing process steps, it is necessary to perform polishing at each process step by setting proper conditions, such as the polishing film material, grit diameter, thickness, hardness and thickness of a resilient material placed on the top surface of the polishing plate, pressure applied to the ferrule, and the polishing speed, thereby resulting in an increase in the required time and cost. Additionally, the use of a diamond grit for polishing made the polishing cost high.

SUMMARY OF THE INVENTION

Accordingly, it is an object of the present invention to provide an apparatus and method for polishing the end faces of a plurality of ferrules of an optical connector at one time, in which independent pressure-applying mechanisms are provided corresponding to the individual ferrules to press them up against a polishing plate, a uniform pressure being applied to the plurality of ferrules, enabling the simultaneous polishing of the end face of a plurality of ferrules with a uniform pressure.

Another object of the present invention is to provide a, polishing apparatus and method in which, by selecting the material of a polishing slurry included in a polishing film used in polishing by the polishing apparatus, it is possible to simplify the polishing process, without using costly diamond grit, thereby enabling both simplification and cost reduction in the polishing process.

Figure 1:
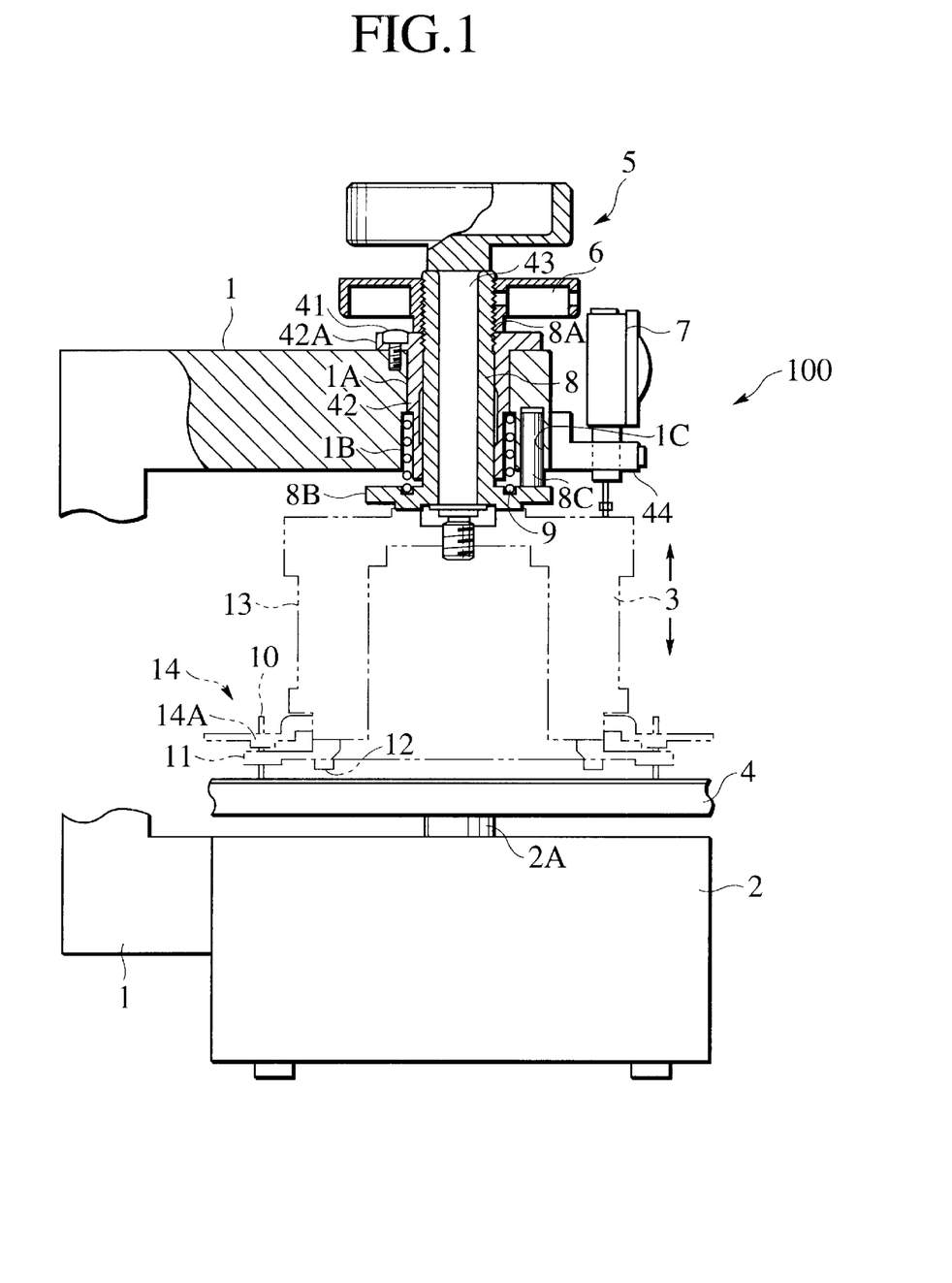
FIG. 1 is a side view showing the overall configuration of an optical connector ferrule polishing apparatus according to an embodiment of the present invention.

According to an aspect of the present invention, as shown in FIG. 1, an apparatus for polishing an optical connector ferrule end face is provided, wherein relative motion is imparted between an optical connector ferrule 10 and a polishing plate 4 so as to polish the end face of the ferrule 10 of the optical connector to a concave spherical surface, this polishing apparatus comprising a polishing plate 4, a polishing apparatus main unit 2 capable of freely moving the polishing plate 4 within an XY plane while rotating it, a cylinder block mechanism 3, and a height-adjusting mechanism 5 disposed above the polishing apparatus main unit 2 and having a plurality of independent pressure-applying mechanisms 13 provided individually so as to correspond to a plurality of ferrules 10, wherein the cylinder block mechanism 3 is caused to move in a direction perpendicular to the polishing plate 4 with the pressure-application mechanisms 13 holding the ferrules 10 at the end thereof.

The pressure-applying mechanism 13 may include a pressure-applying shaft 16 built into the pressure-applying mechanism 13 for applying a prescribed downward pressure with respect to the polishing plate 4 and a ferrule holding section 20 mounted at the end part of the pressure-applying shaft 16 and capable of holding the optical connector ferrule 10 with its end face in opposition to the polishing plate 4 fixed in the vertical direction with respect to the polishing plate 4.

The polishing apparatus main unit 2 may include a rotating mechanism of the polishing apparatus 4 and an XY stage 204 that freely moves a rotating mechanism of the polishing plate 4 and the polishing plate 4 within an XY plane.

According to the above-noted configuration, it is possible via a plurality of independent pressure-applying mechanisms disposed in a ring arrangement in the cylinder block mechanism to apply a pressure to the end faces of ferrules of an optical connector, using the top surface of a polishing filmon the polishing plate as a reference surface. In doing this, even if the lengths of each of the ferrules differ because of buildup of hardened adhesive agent on the end faces of the optical connector ferrules, when polishing is done the independent pressure-applying mechanisms act to apply a uniform pressure to the end faces of all the ferrules. As a result, because the ferrule end faces are polished to convex spherical surfaces, all of the plurality of ferrules can be polished with high precision and little variation therebetween.

The pressure-applying mechanism 13 may include an air cylinder 17 that applies pressure to the pressure-applying shaft 16 by means of the pressure of air supplied from an air supply source.

It is preferable that the pressure of the air supplied to the air cylinder 17 be in controlled within the range from 0.001 to 0.5 MPa.

According to the above-noted configuration, because the pressure-applying mechanisms of the cylinder block mechanism are implemented by air cylinders which press the pressure-applying shafts by means of the air pressure supplied by the air supply source, it is easy to control the setting of the pressure applied to the pressure-applying shafts. By doing this, it is possible to apply the proper pressure to the surface being processed, and to achieve an optimum shape at the end face of the ferrules.

By controlling the air pressure supplied to the air cylinders within the range from 0.001 to 0.5 MPa, it is possible to perform high-precision processing, without variation in the overall length of the ferrules and radius of curvature at the end faces thereof.

Another aspect of a polishing apparatus according to the present invention further comprises a position-limiting member 11 disposed at the bottom of the cylinder block mechanism 3, which stops the movement of the ferrule holding sections 20 at a prescribed position.

According to the above-noted configuration, by providing a position-limiting member at the bottom of the cylinder block mechanism, the polishing of the ferrules is stopped at the point at which the lengths of the ferrules are made uniform, thereby achieving uniform ferrule lengths, and enabling high-precision fixed-dimension processing of the ferrules without variation therebetween.

The polishing plate 4 may include a base plate, a resilient sheet 25 disposed on the base plate, and a polishing film 24 provided on the top of the resilient sheet 25.

The above-noted resilient film 25 can be made of rubber of a uniform thickness.

The polishing film 24 preferably includes a polishing grit made of an oxide or a carbide type grit.

The polishing film 24 preferably is includes at least one of $Al_2O_3$, SiC, and $SiO_2$.

According to the above-noted configuration, the polishing plate is formed by a base plate, onto which is placed resilient sheet made of rubber having a uniform thickness, over the top of which is provided a polishing film that includes grit made of an oxide or a carbide polishing grit, thereby achieving a high polishing efficiency and enabling simultaneous adhesive agent removal and convex spherical surface polishing of the end surfaces of the ferrules.

Figure 6:
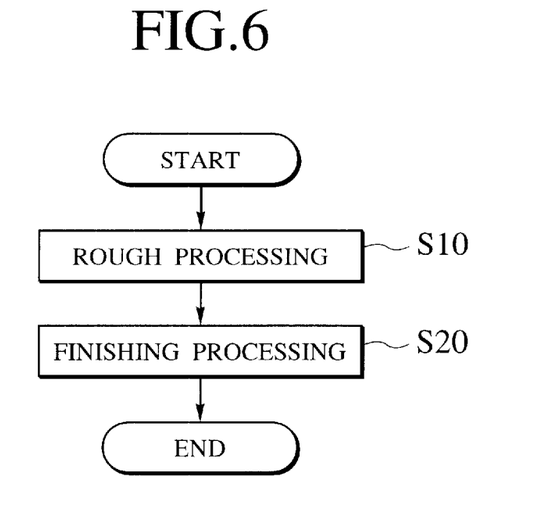
FIG. 6 is a process diagram illustrating the polishing process in an optical connector ferrule polishing method according to an embodiment of the present invention.

Another aspect of the present invention, is a method of polishing the end face of a ferrule for an optical connector, this method comprising steps of (a) removing an adhesive agent 22 from the end face of a ferrule 10 and polishing the end face to a convex spherical surface by using a first polishing film 24A that includes an oxide or a carbide grit as a polishing member, and (b) performing finishing polishing of a convex spherical surface formed on the end face of the ferrule by using a second polishing film 24B that includes an oxide finishing agent.

According to the above-noted steps, by using an oxide or carbide grit as the polishing member, it is possible with just a first step of removing an adhesive agent from the end face of a ferrule and polishing the end face to a convex spherical surface and a second step of performing finishing polishing of the convex spherical surface formed on the end face of the ferrule, thereby facilitating the high-precise polishing of the ferrule end face without distortion. These polishing steps can be incorporated into either the polishing apparatus of the present invention or a general optical connector ferrule polishing apparatus.

The first polishing film 24A preferably includes at least one of $Al_2O_3$ and SiC.

The second polishing film 24B preferable includes $SiO_2$.

By using the above-noted polishing grits, it is possible with an appropriate polishing efficiency, to polish a plurality of ferrule end faces without leaving large scratches on the end faces, and to do so without the need for expensive diamond polishing grit. Additionally, the convex spherical surfaces of the ferrule end faces are formed at one time, and it is possible to remove a work-changed layer caused by SiC or $Al_2O_3$ by merely using $SiO_2$ for finishing. As a result, it is possible to simplify the polishing process, without using costly diamond grit, thereby providing not only a cost reduction, but also simplification of the polishing process.

Other features and advantages of the present invention will become apparent from the following description, taken in conjunction with the accompanying drawings.

BRIEF DESCRIPTION OF THE DRAWINGS

The accompanying drawings, which are incorporated in an constitute a part of the specification, illustrate presently preferred embodiments of the invention, and together with the general description given above and the detailed description of the preferred embodiments given below, serve to explain the principles of the invention, wherein.

DESCRIPTION OF THE PREFERRED EMBODIMENTS

Embodiments of a polishing apparatus and a method for polishing the end face of an optical connector ferrule according to the present invention are described in detail below, with reference being made to FIG. 1 through FIG. 10.

This embodiment is provided with a independent pressure-applying mechanisms corresponding to each ferrule to be pressed against the polishing plate, and applies uniform pressure to a plurality of ferrules, thereby polishing a plurality of ferrule end faces simultaneously and with a uniform pressure.

FIG. 1 shows the overall configuration of a polishing apparatus 100 according to an embodiment of the present invention, which performs polishing of the end faces of optical connector ferrule end faces to convex spherical surfaces. The ferrule end face polishing apparatus 100 comprises a polishing apparatus main unit 2, on the top surface of which is mounted a polishing plate 4. The polishing plate 4 is rotated by a rotating shaft 2A, which can be moved in a predetermined polishing path, for example in the path of the outer contour of the petals of a flower, by means of rotational drive mechanism form by a combination of an XY stage and a planetary gear mechanism built into the polishing apparatus main unit 2.

The rotational drive mechanism built into the polishing apparatus main unit 2 used in the present invention can be, for example, the mechanism disclosed in the Japanese Patent Laid-open Application publication H6-15556.

Figure 2:
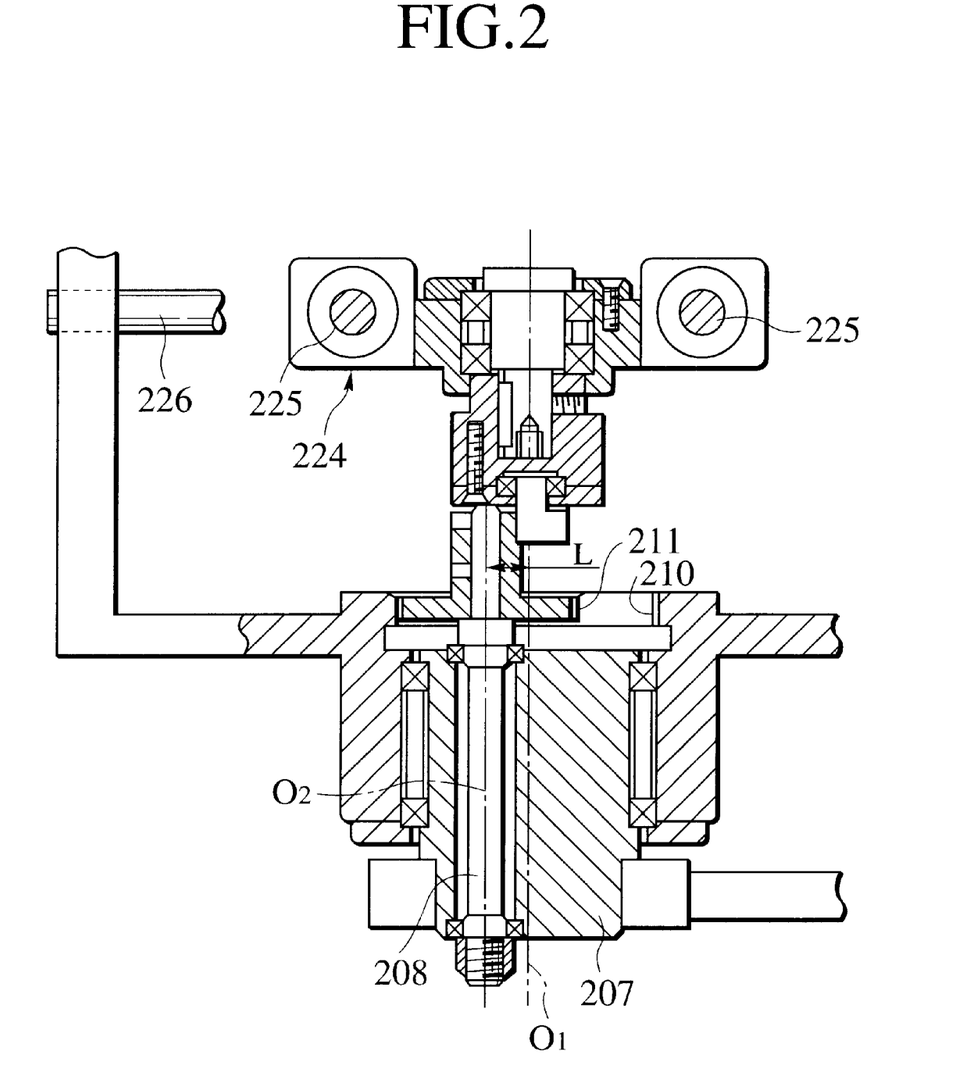
FIG. 2 is a partial side view showing details of the configuration of the polishing apparatus of FIG. 1.

FIG. 2 is a drawing showing an example of the above-noted polishing apparatus main 2 used in the polishing apparatus 100 of FIG. 1.

An XY stage 204 has a pair of X-axis guide rods 225 that pass completely therethrough and can freely move in X-axis direction. Sliders (not shown in the drawing) are fixed to the two ends of the guide rod 225, and a guide rod 226 for the Y axis pass through these sliders, the XY stage 204 being freely movable in the Y-axis direction. The guide rods are fixed to a supporting frame 1. The XY stage, therefore, is supported by the supporting frame 1 by means of the guide rods 225 and 226, and the polishing plate 4 that is integral with the XY stage 204 is thus supported so as to be freely movable in the XY plane.

The planetary gear mechanism has an internal-tooth gear 210 on a center of rotation of $O_1$ of a rotational drive shaft 207, and an external-tooth gear 211 that is integrally mounted to the top end of a rotating shaft 208 and has as its center of rotation the center of rotation $O_2$ of the rotating shaft 208. By means of the planetary gear mechanism, which has the internal-tooth gear 210 as the sun gear and the external-tooth gear 211 as a planet gear, the revolution and autorotation of the external-tooth gear are combined so as to move the polishing plate 4 with respect to the ferrule end face in a path that is the shape of the petals of a flower.

Returning to FIG. 1, a supporting arm 1 for mounting the cylinder block mechanism 3 that polishes the optical connector ferrules 10 is provided on one side surface of the polishing apparatus main unit 2. After extending toward the top of the polishing apparatus main unit 2, this supporting arm ends horizontally toward the polishing plate 4, and the end thereof is extended to a position that is beyond the center part of the polishing plate 4. On the end part of the supporting arm 1 is provided a through hole 1A, to which is mounted a height-adjusting mechanism 5. The cylinder block mechanism 3 for mounting a plurality of ferrules 10 and polishing the end faces thereof is suspended from this height-adjusting mechanism 5.

The height-adjusting mechanism 5 has a stroke-adjusting knob 6, a dial gauge 7, suspension pipe 8, a compression coil spring 9, a bolt 41, a sleeve 42, and a height-adjusting shaft 42. The sleeve 42 is tubular and, after it is inserted into the through hole 1A, a flange 42A provided on its top end part is fixed to the supporting arm 1 by the bolt 41. The suspension pipe 8 is tubular and has an outer peripheral threaded part 8A, and is provided with a flange 8B on its lower end part. This suspension pipe 8 is slidably inserted into the sleeve 42. The suspension pipe 8 has an upward pulling force applied to it by means of the compression coil spring 9, which is mounted between an expanded-diameter part 1B provided at the lower part of the through hole 1A and the flange 8B. The stroke-adjusting knob 6 is screwed onto the threaded part 8A provided on the outer periphery of the top end of the suspension pipe 8, and is adjacent to the sleeve 42. By rotating the stroke-adjusting knob 6, the suspension pipe 8 repels the upward pulling force of the compression coil spring 9 so as to move in a direction perpendicular to the polishing plate 4.

A pin 8C is provided so as to protrude from the flange 8B, this pin 8C being inserted into a guide hole 1C provided in the supporting arm 1, so that the suspension pipe 8 is guided so as to move perpendicularly toward the polishing plate 4. The height-adjusting shaft 43 is fitted into the suspension pipe 8, and the cylinder block mechanism 3 is suspended from the lower end part thereof. The dial gauge 7 is provided on the end surface of the supporting arm 1 with an intervening mounting arm 44 therebetween. This dial gauge 7 measures the protrusion position and amount of movement of the ferrule 10 in the cylinder block mechanism 3.

The configuration of the cylinder block mechanism 3 suspended from the height-adjusting mechanism 5 as noted above is described below with reference to FIG. 3.

Figure 3:
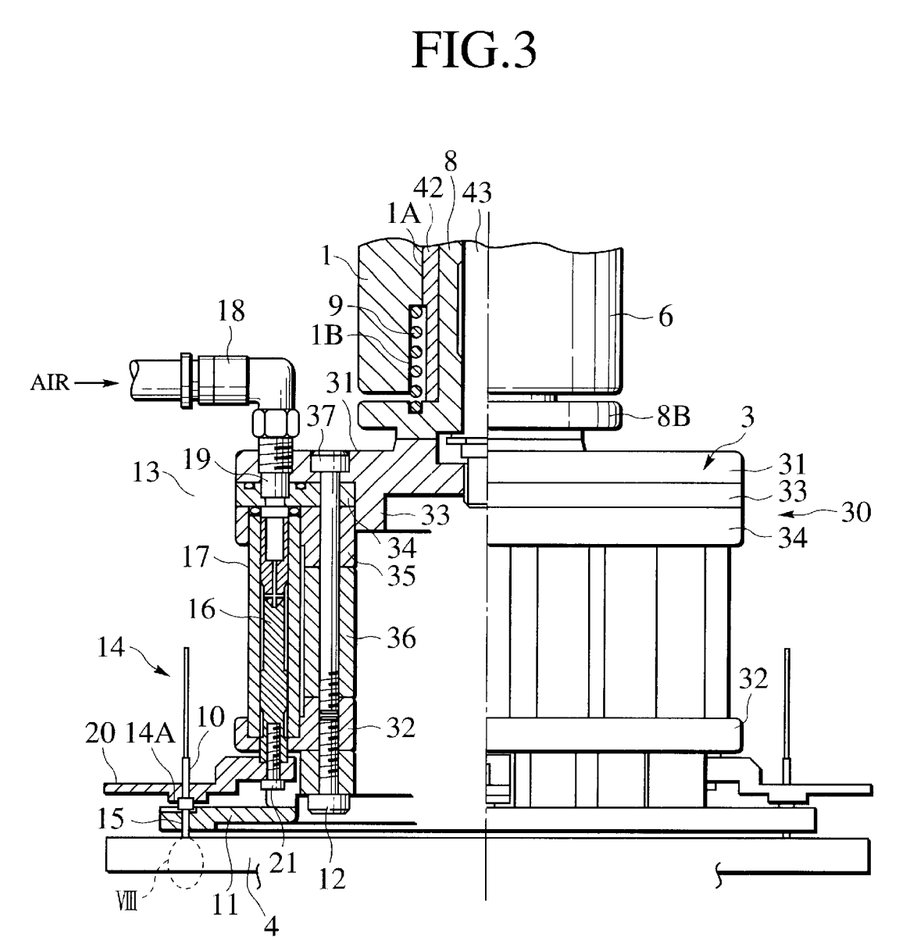
FIG. 3 is a partial cross-section view showing details of the configuration of the cylinder block mechanism of FIG. 1.

FIG. 3 shows a cross-section view of the main part of the cylinder block mechanism 3. The cylinder block mechanism 3 according to this embodiment comprises a circular top plate 31 and a circular bottom plate 32, first and second rings 34 and 35, which are fitted around the periphery of a circumferential wall 33 protruding from the lower surface of the top plate 31, a pipe-shaped spacer 36 inserted between the second ring 35 and the bottom plate 32, a joining bolt 37 that passes from the upper surface of the top plate 31 through the first and second rings 34 and 35, the spacer 36, and the bottom plate 32 so as to join these elements, a stopper 11 mounted to the lower surface of the bottom plate 32 by a mounting screw 12, and a pressure-applying mechanism 13 for applying pressure to a ferrule. The cylinder block mechanism main unit 30 formed by the joining by the joining bolt 37 of the top plate 31, the first and second rings 34 and 35, the spacer 36, and the bottom plate 32 is in the form of a cylindrical cage. A plurality of pressure-applying mechanisms 13 for applying pressure to the ferrule 10, therefore, can be mounted radial around the outer periphery of the cylinder block mechanism main unit 30 at a prescribed angle interval.

The ferrule pressure-applying mechanisms 13 according to this embodiment are each formed by an air cylinder (hereinafter simply referred to as a cylinder) 17 in which a piston shaft 16, which is the pressure-applying shaft, is slidably housed, a port 19 which is open toward the top plate 31 and the first and second rings 34 and 35 so as to supply pressurized air (hereinafter referred to as air) to the cylinder 17, an air joint 18 connected to the port 19, and an optical fiber holding section 14 mounted to the end part of the piston shaft 16. The cylinder 17 is held between the first ring 34 and the bottom plate 32. The piston shaft 16 is lowered when the air is supplied to the cylinder 16 via the air joint 18 and the port 19, so that the optical fiber holding section 14 mounted to the end part thereof is caused to move toward the polishing plate 4. The optical fiber holding section 14 comprises a ferrule holding plate 20 capable of mounting a ferrule 10 and a mounting bolt 21 that mounts the ferrule mounting plate 20 to the end part of the piston shaft 16.

Figure 4A:
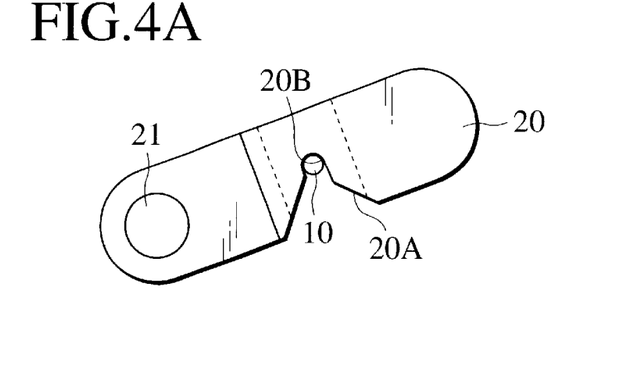
FIGS. 4A and 4B are plan views showing the operation of the ferrule holding plate in an embodiment of the present invention.
Figure 4B:
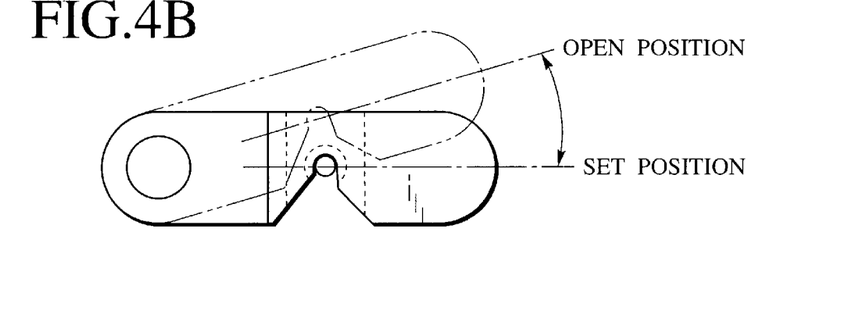

The ferrule holding plate 20, as shown in FIG. 4A, has a substantially triangular guide groove 20A cut out of one side near its center part in the longitudinal direction, at the base part of which is provided a circular groove 20B for holding the ferrule 10. The ferrule holding plate 20, as shown in FIG. 4B, can rotate from the position shown by the solid line to the position shown by the double-dot-dash line, about the mounting bolt 21 as a pivot.

Returning to FIG. 3, a stopper 11 is disposed in a space between each of the ferrule holding plates 20 and the polishing plate 4 as a position-limiting member fixed to the lower surface of the bottom plate 32 by a fixing bolt 12. The stopper 11 is provided with a ferrule passage hole 15 for the purpose of passing the end part of the ferrule 10 mounted to the ferrule holding plate 20. On the lower surface of the ferrule holding plate 20 is provided a step part 14A that protrudes toward the stopper 11 on the peripheral part of the mounting part of the ferrule 10.

Figure 5:
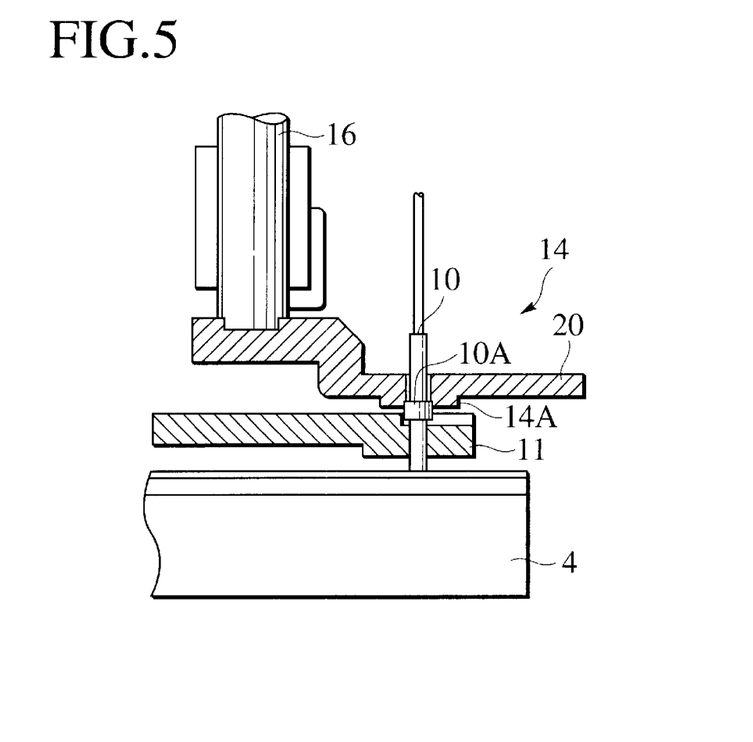
FIG. 5 is a drawing showing the condition in which a polishing apparatus according to an embodiment of the present invention polishes the end face of a ferrule.

Additionally, as shown in FIG. 5, an expanded-diameter part 10A is provided in the center part of the ferrule 10. When the ferrule 10 is mounted onto an optical fiber holding section 14, as shown in FIG. 4A, first, without supplying air, the ferrule holding plate 20 is caused to rotate about the mounting bolt 21 as a center, and is brought back so that the round groove 20A of the holding plate 20 does not overlap with the passage hole 15 of the stopper 11. Next, as shown in FIG. 4B, the end part of the ferrule 10 is inserted into the passage hole 15 of the stopper 11 in this condition and, with the end part of the ferrule 10 butted up against the polishing plate 4, the ferrule holding plate 20 is returned to its original position, so that the bottom surface of the ferrule holding plate 20 rests on the upper surface of the expanded-diameter part of the ferrule 10. By doing this, the ferrule 10 is held in the optical fiber holding section 14, held between the passage hole 15 of the stopper 11 and the round groove 20B of the ferule holding plate 20.

Because the polished end face of the ferrule 10 is small, in the adhesive removal and rough polishing step (step S10) shown in FIG. 6, there is no particular need for a polishing film with a high polishing capacity. On the contrary, it is necessary to polish the surface so that there is little damage imparted thereto. In contrast to this, in the finishing polishing of the next step (step S20), it is necessary to control the radius of curvature and limit the damage and distortion, and work-changed layer at the end face of the ferrule 10. In a process step such as this, it is necessary to perform precise processing while imparting a minute amount of pressure.

Because this embodiment uses an air cylinder 17 as the pressure-applying mechanism 13 to accommodate the above requirements, with respect to a polishing film that is attached to the top of a resilient rubber sheet 25 laid over the top of the polishing plate 4, the ferrule 10 is held and moved in the vertical direction as an appropriate pressure in the range 0.001 to 0.5 Mpa, for example, is applied to the end surface of each ferrule 10. By doing this, even if there is variation between the overall lengths of the ferrules 10, it is possible to process the end faces of the ferrules 10 to a highly precise radius of curvature, with no variations therebetween.

Figure 7:
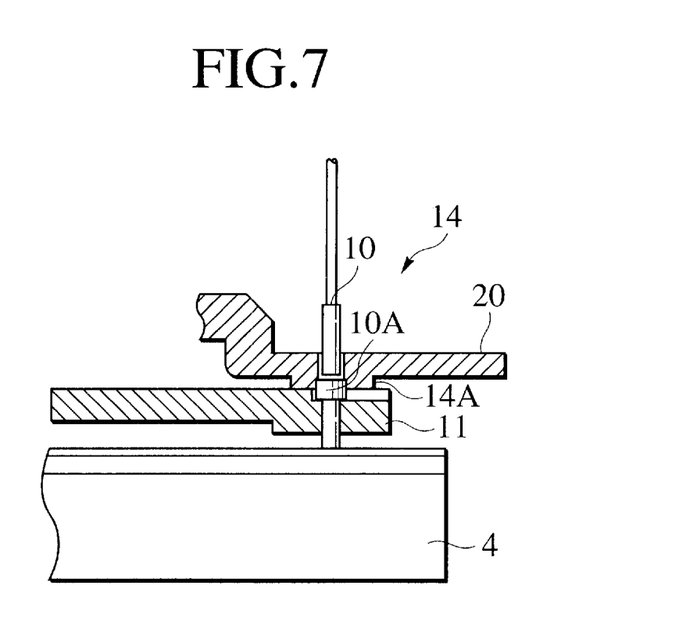
FIG. 7 is a drawing showing the condition in which a polishing apparatus according to an embodiment of the present invention has finished polishing the end face of a ferrule.

The controlling of the air pressure supplied to the air cylinder 17 to the range from 0.001 to 0.5 MPa is done because at an air pressure of less than 0.001 MPa it is difficult to form a curved surface with the prescribed curvature, while at an air pressure exceeding 0.5 MPa, the curvature is reduced excessively. It is more preferable that the air pressure be in the range from 0.005 to 0.4 MPa. When the piston shaft 16 is lowered in response to air supplied to the air cylinder 17, the optical connector ferrule 10 held by the ferrule holding plate 20 is lowered so that, as shown in FIG. 5, the end part of the ferrule 10 is polished. Next, when the polishing of the end face of the ferrule 10 proceeds, the piston shaft 16 protrudes further from the air cylinder 17. However, because the stopper position is fixed, the step part 14A ultimately comes into contact with the upper surface of the stopper 11, so that the ferrule holding plate 20 can be lowered no further, as shown in FIG. 7. As a result, it is possible to achieve a uniform length of the end faces of the plurality of ferrules 10 from the ferrule holding plate 20.

Figure 8:
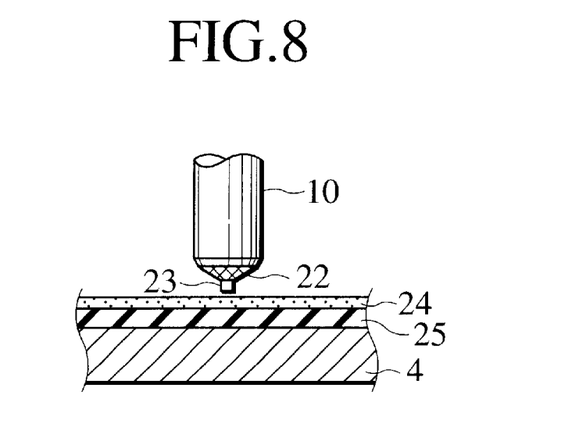
FIG. 8 is an enlarged cross-section view of the part of FIG. 3 indicated by the symbol VIII.

FIG. 8 shows a partial enlarged view of the part of FIG. 3 indicated by the symbol VIII in the condition before polishing. Because the ferrule 10 has not yet been polished at this stage, there is a buildup of hardened optical adhesive agent 22 on the end part thereof, and the bare optical fiber 23 protrudes out from this optical adhesive agent 22. Are silient rubber sheet 23 having a uniform thickness is placed on the upper surface of the polishing plate 4, and over this is attached a polishing film 24.

In a optical connector ferrule end face polishing apparatus 100 configured as described above according to this embodiment, by taking care with the polishing grit that is included in the polishing film 24, as shown in FIG. 6, it is possible to perform highly precise processing of the end face of a ferrule 10 to a convex spherical shape, with just two steps: the first step of rough processing (step S10), and the second step of finishing processing (step S20).

Of course when the end of the bare optical fiber 23, as shown in FIG. 8, is protruding from the adhesive agent 22, and even when the end part of the bare optical fiber 23 is buried in the adhesive agent 22, it is possible to achieve good polishing. It is additionally possible to remove adhesive agent that has become attached to the tapered part at the bottom of the ferrule 10.

Figure 9:
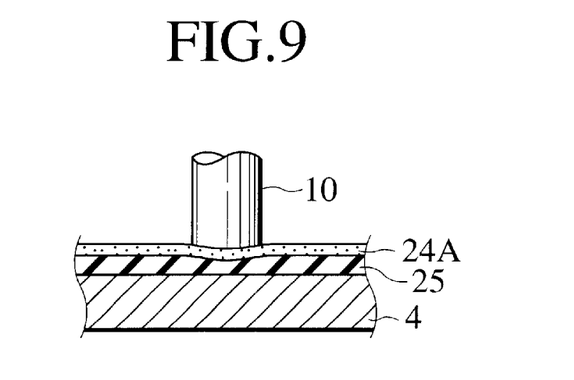
FIG. 9 is an enlarged partial cross-section view showing the part of FIG. 8 that shows the rough processing step shown in FIG. 6.

FIG. 9 shows the rough processing step S10. In performing rough processing, a rough polishing film 24A is attached to the resilient rubber sheet 25 on the top of the polishing plate 4. This rough polishing film 24A has applied to it $Al_2O_3$ as an oxide polishing grit, or has applied to it SiC as a carbide polishing grit. The $Al_2O_3$ oxide polishing grit or SiC carbide polishing grit has an appropriately high polishing efficiency, and does not leave excessive damage on the end face of the ferrule. For this reason, it is possible to remove adhesive agent that has built up on the end face of the ferrule and to form the end face of the ferrule into a convex spherical surface, without using diamond grit as a polishing grit.

Figure 10:
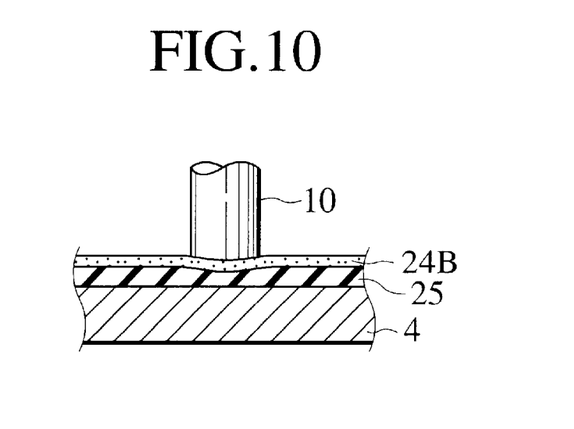
FIG. 10 is an enlarged partial cross-section view showing the part of FIG. 8 that shows the finishing processing step shown in FIG. 6.

FIG. 10 shows the finishing processing step S20. In the finishing processing, a finishing polishing film 24B is attached to the resilient rubber film 25 on the top of the polishing plate 4. The finishing polishing film 24B has applied to it $SiO_2$ as a polishing grit. The $SiO_2$ polishing grit removes a work-changed layer that occurs in step S10 because of the $Al_2O_3$ or SiC grit.

It is alternately possible to use as the polishing film 24A in the rough polishing step S10 a polishing film to the surface to which, instead of $Al_2O_3$, $ZrO_2$ has been applied, and to use as the finishing polishing film 24B a polishing film to the surface of which, instead of $SiO_2$ has been applied $CeO_2$ or $Cr_2O_3$. The thickness of the above-noted polishing film 24A and B are from 0.01 to 0.5 mm, and preferably in the range 0.02 to 0.4 mm. The thickness of the resilient rubber sheet 25 is 0.2 to 5 mm, and preferably in the range 0.3 to 4 mm. The material used for the ferrule 10 is zirconia, crystalline glass, or plastic or the like.

According to this embodiment as described above, by using an oxide grit such as $Al_2O_3$ or a carbide grit such as SiC as the polishing grit in the rough polishing step, and by using $SiO_2$ in the finishing polishing step, it is possible to polish a plurality of ferrule end faces with an appropriate polishing efficiency and without leaving much damage thereon. It is possible to simultaneously form the convex spherical shapes on the ferrule end faces, and to remove the work-changed layer occurring because of the use of SiC or $Al_2O_3$, by performing finishing polishing using $SiO_2$. As a result, it is possible to reduce the polishing cost and simplify the polishing process, without using costly diamond polishing grit.

While in the above-noted embodiment of the present invention, the method of polishing an optical connector ferrule end face shown in FIG. 6 was described for the case of using the optical connector ferrule end face polishing apparatus 100 illustrated in FIG. 1 and FIG. 3, it will be understood that the present invention can be applied to other polishing apparatuses as well, and that there is no particular restriction imposed by the present invention with regard to the optical connector ferrule end face polishing apparatus used to perform the method of polishing the optical connector ferrule end face of the described embodiment.

In summary, the optical connector ferrule end face polishing apparatus and method according to the present invention achieve the following effects.

First, it is possible to simultaneously apply pressure to the end faces of ferrules, using a polishing film on the polishing apparatus as a singular reference surface, via a plurality of pressure-applying mechanisms disposed around the periphery of a cylinder block mechanism. In doing this, even if the lengths of each of the ferrules differ because of a build up of adhesive agent on the end faces thereof, it is possible when polishing by using independent pressure-applying mechanism to apply a uniform pressure to the end faces of all the ferrules. As a result, convex spherical surfaces are achieved on the ferrule end faces, and all of the plurality of ferrules are precisely polished, without variation between ferrules.

Second, because the pressure-applying mechanisms of the cylinder block mechanism are formed by air cylinders that apply pressure in response to air pressure from an air supply source, control of the pressure applied to the pressure shaft is facilitated. By doing this, it is possible to perform processing of the surfaces being polished with an appropriate pressure, and to polish the ferrule end faces to an optimum shape.

By controlling the air pressure supplied to the air cylinders to within the range 0.001 to 0.5 MPa, it is possible to perform shape processing with no variations in overall length and radius of curvature of the ferrules.

Third, by using a position-limiting member at the bottom of the cylinder block mechanism, the polishing is stopped at the point at which the lengths of the ferrules are made uniform, so that the ferrule lengths are controlled to a constant length, thereby enabling highly precise fixed-dimension processing of the ferrules, without variations.

Fourth, because the polishing plate includes a base plate, a resilient sheet made of rubber of a uniform thickness placed on the base plate, and a polishing film provided on top of the resilient sheet, and which includes either an oxide or a carbide polishing grit, polishing efficiency is increased and it is possible to simultaneously remove an adhesive agent from the ferrule end face and process the end face into a convex spherical shape.

That is, by using in the optical connector ferrule end face polishing apparatus of this embodiment or by using in a general polishing apparatus a film that includes either an oxide or a carbide polishing grit, by just a first polishing step of removing a build up of adhesive agent from the ferrule end face and shaping the end face into a convex spherical shape and a second polishing step of performing finishing polishing of the convex spherical shape, it is easy to perform highly precise, distortion free polishing of end faces of ferrules.

By using $Al_2O_3$ as an oxide polishing grit or SiC as a carbide polishing grit in the above-noted rough polishing step and using $SiO_2$ as a polishing grit in the finishing polishing step, it is possible to polish the end faces of a plurality of ferrules, with high precision, and without leaving much damage on the surfaces thereof. For this reason, it is possible to perform polishing without using high-cost diamond polishing grit. It is also possible to form the convex spherical shapes on the end faces of the ferrules at one time, and also to remove, using $SiO_2$, a work-changed layer that occurs being of the SiC or $Al_2O_3$. As a result, it is possible to achieve a simplification of the polishing process without using costly diamond polishing grit, thereby achieving both low cost and simplicity.

It is to be noted that, beside those already mentioned above, many modifications and variations of the above embodiments may be made without departing from the novel and advantageous features of the present invention. Accordingly, all such modifications and variations are intended to be included within the scope of the appended claims.

What is claimed is:

1. An apparatus for polishing an optical connector ferrule end face wherein relative motion is imparted between an optical connector ferrule (10) of an optical connector and a polishing plate (4) so as to polish an end face of the ferrule (10) to a convex spherical surface, comprising:
   a polishing plate (4);
   a polishing apparatus main unit (2), capable of freely moving the polishing plate (4) within an XY plane while rotating it;
   a cylinder block mechanism (3) disposed above the polishing apparatus main unit (2) and provided with a plurality of pressure-applying mechanism arranged in a ring and each of which corresponds to each of a plurality of ferrules (10);
   a height-adjusting mechanism (5) operative for causing movement of the cylinder block mechanism (3) in a direction perpendicular to the polishing plate (4); and
   an air supplying source for supplying pressurized air to each of the pressure-applying mechanisms,
   wherein the pressure applying mechanisms (13) hold the ferrules (10) in end parts of the pressure-applying mechanisms, each of which presses a corresponding ferrule (10) in a direction perpendicular to the polishing plate (4) with a prescribed pressure.

2. The apparatus according to claim 1, wherein the pressure-applying mechanism includes:
   a pressure-applying shaft (16) built into the pressure-applying mechanism (13) and which is pressed outward in a direction perpendicular to the polishing plate (4) with a prescribed pressure; and
   a ferrule holding section (20) mounted to an end part of the pressure-applying shaft (16), for holding an optical connector ferrule (10) perpendicularly with respect to the polishing plate (4) and with its end face opposing the polishing plate (4).

3. The apparatus according to claim 1, wherein the polishing apparatus main unit (2) includes:

a rotating mechanism of the polishing apparatus (4) and an XY stage (204) for freely moving the polishing apparatus (4) within an XY plane.

4. The apparatus according to claim 2, wherein the pressure-applying mechanism (13) includes:
   an air cylinder (17) that applies pressure to the pressure-applying shaft (16) in response to pressure of air supplied from an air supply source.

5. The apparatus according to claim 4, wherein the pressure of air supplied to the air cylinder (17) is within the range from 0.001 to 0.5 MPa.

6. The apparatus according to claim 1, further comprising:
   a position-limiting member (11) disposed at the bottom of the cylinder block mechanism (3) for stopping movement of the ferrule holding section (20) at a prescribed position.

7. The apparatus according to claim 1, wherein the polishing plate (4) includes:
   a base plate;
   a resilient sheet (25) disposed on top of the base plate; and
   a polishing film (24) provided on top of the resilient sheet (25).

8. The apparatus according to claim 7, wherein the resilient sheet (25) is made of rubber having a uniform thickness.

9. The apparatus according to claim 7, wherein the polishing film (24) includes either an oxide polishing grit or a carbide polishing grit.

10. The apparatus according to claim 9, wherein the polishing film (24) includes at least one substance selected from a group consisting of $Al_2O_3$, SiC, and $SiO_2$.

11. An apparatus for polishing an optical connector ferrule end face wherein relative motion is imparted between an optical connector ferrule (10) of an optical connector and a polishing plate (4) so as to polish an end face of the ferrule (10) to a convex spherical surface, comprising:
    a polishing plate (4);
    a polishing apparatus main unit (2), capable of freely moving the polishing plate (4) within an XY plane while rotating the polishing plate;
    a cylinder block mechanism (3) disposed above the polishing apparatus main unit (2) and provided with a plurality of pressure-applying mechanisms arranged in a ring and each of which corresponds to each of a plurality of ferrules (10);
    a height-adjusting mechanism (5) for causing movement of the cylinder block mechanism (3) in a direction perpendicular to the polishing plate (4),
    wherein the pressure-applying mechanisms (13) hold the ferrules (10) in end parts of the pressure-applying mechanisms, and the polishing apparatus main unit (2) includes:
       a rotating mechanism of the polish apparatus (4) and an XY stage (204) for freely moving the polishing apparatus (4) with an XY plate.

12. An apparatus for polishing an optical connector ferrule end face wherein relative motion is imparted between an optical connector ferrule (10) of an optical connector and a polishing plate (4) so as to polish an end face of the ferrule (10) to a convex spherical surface, comprising:
    a polishing plate (4);
    a polishing apparatus main unit (2), capable of freely moving the polishing plate (4) within an XY plane while rotating the polishing plate;
    a cylinder block mechanism (3) disposed above the polishing apparatus main unit (2) and provided with a plurality of pressure-applying mechanisms arranged in a ring and each of which corresponds to each of a plurality of ferrules (10);

a height-adjusting mechanism (5) for causing movement of the cylinder block mechanism (3) in a direction perpendicular to the polishing plate (4); and a position-limiting member (11) disposed at the bottom of the cylinder block mechanism (3) for stopping movement of the ferrule holding section (20) at a prescribed position.

13. An apparatus for polishing an optical connector ferrule end face wherein relative motion is imparted between an optical connector ferrule (10) of an optical connector and a polishing plate (4) so as to polish an end face of the ferrule (10) to a convex spherical surface, comprising:

a polishing plate (4);

a polishing apparatus main unit (2), capable of freely moving the polishing plate (4) within an XY plane while rotating the polishing plate;

a cylinder block mechanism (3) disposed above the polishing apparatus main unit (2) and provided with a plurality of pressure-applying mechanisms arranged in a ring and each of which corresponds to each of a plurality of ferrules (10);

a height-adjusting mechanism (5) operative for causing movement of the cylinder block mechanism (3) in a direction perpendicular to the polishing plate (4);

wherein the pressure-applying mechanisms (13) hold the ferrules (10) in end parts of the pressure-applying mechanisms; and wherein the pressure-applying mechanism includes:

a pressure-applying shaft (16) built into the pressure-applying mechanism (13) and pressed outward in a direction perpendicular to the polishing plate (4) with a prescribed pressure; and a ferrule holding section (20) mounted to an end part of the pressure-applying shaft (16), for holding an optical connector ferrule (10) perpendicularly with respect to the polishing plate (4) and with the end face of the ferrule opposing the polishing plate (4).

14. An apparatus for polishing an optical connector ferrule end face wherein relative motion is imparted between an optical connector and a polishing plate (4) so as to polish an end face of the ferrule (10) to a convex spherical surface, comprising:

a polishing plate (4);

a polishing apparatus main unit (2), capable of freely moving the polishing plate (4) within an XY plane while rotating the polishing plate;

a cylinder block mechanism (3) disposed above the polishing apparatus main unit (2) and provided with a plurality of pressure-applying mechanisms arranged in a ring and each of which corresponds to each of a plurality of ferrules (10);

a height-adjusting mechanism (5) operative for causing movement of the cylinder block mechanism (3) in a direction perpendicular to the polishing plate (4);

wherein the pressure-applying mechanisms (13) hold the ferrules (10) in end parts of the pressure-applying mechanisms; and wherein the polishing apparatus main unit (2) includes:
a rotating mechanism of the polishing apparatus (4) and an XY stage (204) for freely moving the polishing apparatus (4) within an XY plane.

15. The apparatus according to claim 13, wherein the pressure-applying mechanism (13) includes:

an air cylinder (17) that applies pressure to the pressure-applying shaft (16) in response to pressure of air supplied from an air supply source.

16. The apparatus according to claim 15, wherein the pressure of air supplied to the air cylinder (17) is within the range from 0.001 to 0.5 MPa.

17. An apparatus for polishing an optical connector ferrule end face wherein relative motion is imparted between an optical connector ferrule (10) of an optical connector and a polishing plate (4) so as to polish an end face of the ferrule (10) to a convex spherical surface, comprising:

a polishing plate (4);

a polishing apparatus main unit (2), capable of freely moving the polishing plate (4) within an XY plane while rotating the polishing plate;

a cylinder block mechanism (3) disposed above the polishing apparatus main unit 92) and provided with a plurality of pressure-applying mechanisms arranged in a ring and each of which corresponds to each of a plurality of ferrules (10);

a height-adjusting mechanism (5) operative for causing movement of the cylinder block mechanism (3) in a direction perpendicular to the polishing plate (4);

wherein the pressure-applying mechanisms (13) hold the ferrules (10) in end parts of the pressure-applying mechanisms; and a position-limiting member (11) disposed at the bottom of the cylinder block mechanism (3) for stopping movement of the ferrule holding section (20) at a prescribed position.

18. The apparatus according to claim 13, wherein the polishing plate (4) includes:

a base plate;

a resilient sheet (25) disposed on top of the base plate; and a polishing film (24) provided on top of the resilient sheet (25).

19. The apparatus according to claim 18, wherein the resilient sheet (25) is made of rubber having a uniform thickness.

20. The apparatus according to claim 18, wherein the polishing film includes either an oxide polishing grit or a carbide polishing grit.

21. The apparatus according to claim 20, wherein the polishing film (24) includes at least one substance selected from a group consisting of $Al_2O_3$, SiC, and $SiO_2$.

22. The apparatus according to claim 14, wherein the polishing plate (4) includes:

a base plate;

a resilient sheet (25) disposed on top of the base plate; and a polishing film (24) provided on top of the resilient sheet (25).

23. The apparatus according to claim 22, wherein the resilient sheet (25) is made of rubber having a uniform thickness.

24. The apparatus according to claim 22, wherein the polishing film includes either an oxide polishing grit or a carbide polishing grit.

25. The apparatus according to claim 24, wherein the polishing film (24) includes at least one substance selected from a group consisting of $Al_2O_3$, SiC, and $SiO_2$.

26. The apparatus according to claim 15, wherein the polishing plate (4) includes:

a base plate;

a resilient sheet (25) disposed on top of the base plate; and a polishing film (24) provided on top of the resilient sheet (25).

27. The apparatus according to claim 26, wherein the resilient sheet (25) is made of rubber having a uniform thickness.

28. The apparatus according to claim 26, wherein the polishing film includes either an oxide polishing grit or a carbide polishing grit.

29. The apparatus according to claim 28, wherein the polishing film (24) includes at least one substance selected from a group consisting of $Al_2O_3$, SiC, and $SiO_2$.

30. The apparatus according to claim 17, wherein the polishing plate (4) includes:

a base plate;

a resilient sheet (25) disposed on top of the base plate; and a polishing film (24) provided on top of the resilient sheet (25).

31. The apparatus according to claim 30, wherein the resilient sheet (25) is made of rubber having a uniform thickness.

32. The apparatus according to claim 30, wherein the polishing film includes either an oxide polishing grit or a carbide polishing grit.

33. The apparatus according to claim 32, wherein the polishing film (24) includes at least one substance selected from a group consisting of $Al_2O_3$, SiC, and $SiO_2$.

* * * * *